US008034245B1

(12) United States Patent
Snezhko et al.

(10) Patent No.: US 8,034,245 B1
(45) Date of Patent: Oct. 11, 2011

(54) METHOD OF DRIVING LIQUID FLOW AT OR NEAR THE FREE SURFACE USING MAGNETIC MICROPARTICLES

(75) Inventors: Oleksiy Snezhko, Woodridge, IL (US); Igor Aronson, Darien, IL (US); Wai-Kwong Kwok, Evanston, IL (US); Maxim V. Belkin, Woodridge, IL (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 723 days.

(21) Appl. No.: 12/174,781

(22) Filed: Jul. 17, 2008

Related U.S. Application Data

(63) Continuation-in-part of application No. 11/641,337, filed on Dec. 19, 2006, now Pat. No. 7,875,187.

(51) Int. Cl.
*B01D 35/06* (2006.01)

(52) U.S. Cl. ........................................ 210/695; 204/557

(58) Field of Classification Search .................. 210/695; 204/557

See application file for complete search history.

(56) References Cited

U.S. PATENT DOCUMENTS

| | | | |
|---|---|---|---|
| 4,310,253 A | 1/1982 | Sada et al. | |
| 4,936,687 A | 6/1990 | Lilja et al. | |
| 5,222,808 A | 6/1993 | Sugarman et al. | |
| 6,033,574 A | 3/2000 | Siddiqi | |
| 6,228,268 B1 | 5/2001 | Siddiqi | |
| 6,616,730 B1 | 9/2003 | Bienvenu | |
| 6,776,174 B2 | 8/2004 | Nisson et al. | |
| 7,875,187 B2 * | 1/2011 | Snezhko et al. | 210/695 |
| 2007/0036026 A1 | 2/2007 | Laibinis et al. | |
| 2007/0207272 A1 | 9/2007 | Puri et al. | |

OTHER PUBLICATIONS

Snezhko, et al., "Surface Wave Assisted self-assembly of Multidomain Magnetic Structures," Physical Review Letters, Feb. 2006, vol. 96, Issue 7, The American Physical Society, Ridge, NY.

Snezhko, et al., "Dynamic self-assembly of magnetic particles on the fluid interface: Surface-wave-mediated effective magnetic exchange," Physical Review E, Apr. 2006, vol. 73, 041306, The American Physical Society, Ridge, NY.

* cited by examiner

*Primary Examiner* — David A Reifsnyder

(74) *Attorney, Agent, or Firm* — James B. Potts; Brian J. Lally; John T. Lucas

(57) ABSTRACT

The present invention provides a method of driving liquid flow at or near a free surface using self-assembled structures composed of magnetic particles subjected to an external AC magnetic field. A plurality of magnetic particles are supported at or near a free surface of liquid by surface tension or buoyancy force. An AC magnetic field traverses the free surface and dipole-dipole interaction between particles produces in self-assembled snake structures which oscillate at the frequency of the traverse AC magnetic field. The snake structures independently move across the free surface and may merge with other snake structures or break up and coalesce into additional snake structures experiencing independent movement across the liquid surface. During this process, the snake structures produce asymmetric flow vortices across substantially the entirety of the free surface, effectuating liquid flow across the free surface.

20 Claims, 11 Drawing Sheets

METHOD OF DRIVING LIQUID FLOW AT OR NEAR THE FREE SURFACE USING MAGNETIC MICROPARTICLES

RELATION TO OTHER APPLICATIONS

This patent application is a continuation-in-part and claims priority to U.S. patent application Ser. No. 11/641,337 filed Dec. 19, 2006, submitted by Snezhko et al., now U.S. Pat. No. 7,875,187 B2, which is hereby incorporated by reference in its entirety.

STATEMENT OF GOVERNMENTAL SUPPORT

The United States Government has rights in this invention pursuant to Contract No. DE-AC02-06CH11357 between the U.S. Department of Energy and UChicago Argonne, LLC.

TECHNICAL FIELD

A method of driving liquid flow utilizing magnetic particles dispersed on or near the free surface of the liquid and subjected to an external AC magnetic field oriented such that the magnetic field lines traverse the free surface of the liquid. The magnetic particles experience strong dipole-to-dipole attractions sufficient to overcome magnetic torques acting to align the magnetic particles with the external AC magnetic field, and form a multiplicity of snake structures lying essentially in the plane defined by the free surface of the liquid. The multiplicity of snake structures harmonically oscillate at the frequency of the magnetic field and experience independent movement across the free surface, driving liquid vortices and effectuating liquid flow at or near the free surface. The presented embodiment relates to a method of driving liquid flow at or near a free surface through vortices formed by the action of nickel microparticles suspended on a free surface of water.

BACKGROUND OF THE INVENTION

Magnetic particles are known for use in laboratory and industrial procedures in which such particles are transported by applied magnetic fields. Typically, these procedures disperse particles in a liquid and impose a magnetic field on the liquid to magnetize the particles. The magnetized particles are then moved through the liquid by altering the specific orientation of the magnetic field lines with respect to the liquid, and utilizing the natural tendency of the magnetic particles to align and experience magnetic attractions. The ease with which these magnetic particles may be moved within the liquid and subsequently collected using a means of magnetic attraction has led to wide use of this technique to create forced liquid circulations to mix heterogeneous components, facilitate chemical and biological reactions, reduce transfer resistances at or near the free surface of the liquid, and conduct other processes aided by liquid agitation.

Existing methods have largely relied on the tendency of a magnetic particle subjected to an external magnetic field to align itself with the external magnetic field lines in such a way that the magnetic particle stabilizes into the configuration with the lowest energy. The magnetic particle tends to align in opposed polarity to the external magnetic field, and experiences a torque causing rotation of the magnetic particle's magnetic dipole moment by one of two ways: (i) the magnetic dipole moment itself can rotate inside the particle against the internal magnetic anisotropy field, or (ii) the entire magnetic particle can physically rotate, thus keeping the magnetic dipole moment aligned with the internal anisotropy field and the external magnetic field lines. In addition to this rotation, the magnetic particle may also experience movement driven by a magnetic drag force governed by the dipolar fields of any neighboring magnetic particles and the external magnetic field. The existing methods for driving liquid flow using magnetic particles stimulate these effects simultaneously on a multiplicity of magnetic particles, thereby agitating the liquid.

In the existing methods, the external magnetic field source can be one or more permanent magnets, electromagnets or a combination thereof. The magnetic particle may be a permanent magnet or a material which is magnetized by the external magnetic field. The external magnetic field source is established such the external magnetic field lines penetrate through the medium to some degree, and the magnetic particles correspondingly experience rotation and movement as outlined above to establish magnetic dipole moment alignment. The relative spatial orientation between the external magnetic field lines and the medium is then altered by physically relocating the magnetic field source or the medium, or, in the case of an electromagnet, through control of input power. As a result of this altered relative spatial orientation, the magnetic dipole moments of individual particles realign in accordance with the now altered orientation of the external magnetic field lines, resulting in particle movement through the medium. This movement acts to disturb the medium in which the particles are dispersed. Continuous alteration of magnetic field line spatial orientation in this manner produces essentially constant movement of the particles through the medium. (See, U.S. Pat. No. 6,228,268 B1 issued to Siddiqi, issued on May 8, 2001; U.S. Pat. No. 4,936,687 issued to Lilja, et al, issued Jun. 26, 1990; U.S. Pat. No. 6,033,574 issued to Siddiqi, issued on Mar. 7, 2000; U.S. Pat. No. 6,776,174 B2 issued to Nisson, et al, issued on Aug. 17, 2004; U.S. Pat. No. 4,310,253 issued to Sada, et al, issued on Jan. 12, 1982; U.S. Pat. No. 6,616,730 issued to Bienvenu, issued on Sep. 9, 2003). A drawback to these methods is the requirement for essentially continuous alternation of the relative spatial orientation between the external magnetic field lines and the medium, which requires either complex physical apparatus in order to physically relocate the magnetic field source or the medium, or, in the case of an electromagnet, intricate timing mechanisms to vary input power in a predetermined manner. Additionally, since the liquid agitation rate in these systems depends directly on the rate at which the relative spatial orientation can be altered, any complex physical apparatus relied on to physically relocate the AC magnetic field source or the medium fades severe limitation as the rate is increased.

Other methods for liquid agitation using magnetic particles utilize self-assembled solid-state structures to aid the agitation. These methods establish a magnetic particle density and an external magnetic field strength such that, as magnetic particles in the liquid approach each other and experience dipole-to-dipole attraction, the magnetic particles self-assemble into solid-state-structures. These solid-state structures possess a characteristic magnetic moment, and as the external magnetic field orientation is altered, the structures realign with the altered magnetic field lines and thereby move through the medium. Typically, as the structures move through the medium, they periodically break apart into component magnetized particles, which then experience additional dipole-to-dipole attractions sufficient to result in the self-assembly of new structures with characteristic magnetic moments. In these methods, the self-assembly of magnetic particles is deliberately provoked in order to increase the agitation of the medium as self-assembled structures rather than individual magnetic particles move through the medium (See U.S. Pat. No. 5,222,808, issued to Sugarman, et al, issued on Apr. 10, 1992; U.S. Patent Application No. 2007/0207272 A1, submitted by Pun, et al, published Sep. 6, 2007; U.S. Patent Application 2007/0036026 A1, submitted by Laibinis, et al, published Feb. 15, 2007). These methods offer advantage in some situations, however they still rely on magnetic dipole alignment with external magnetic field lines, and still require essentially continuous alternation of the relative spatial orientation between the external magnetic field lines and the medium. As a result, they retain the drawback of requiring either complex physical apparatus in order to physically relocate the magnetic field source or the medium, or, in the case of an electromagnet, intricate timing mechanisms to vary input power in a predetermined manner.

Snezhko, et al., has reported the formation of self-assembled structures which oscillate around stationary positions on the liquid surface and produce highly stable, localized, stationary vortex flows, with essentially dead flow areas existing outside the stable vortices. These self-assembled structures are produced by suspending magnetic particles on a free surface, and subjecting these particles to a traverse AC magnetic field. See "Surface Wave Assisted Self-assembly of Multidomain Magnetic Structures," *Physical Review Letters*, vol 96, Issue 7, (February 2006), and, "Dynamic self-assembly of magnetic particles on the fluid interface: Surface-wave-mediated effective magnetic exchange," *Physical Review E*, vol 73, 041306 (April 2006), "which are hereby incorporated by reference in their entirety. However, Snezhko, et al., limits his discussion to low frequency regimes where self-assembled structures oscillate around essentially stationary points on the free surface, producing stable liquid vortices with dead flow areas outside the vortices where mixing is severely compromised.

What is presented here is a novel method of driving liquid flow at or near the free surface of a liquid by utilizing non-stationary, self-assembled structures which independently move across the free surface. During the course of this movement, the oscillations of the self-assembled structures produce a series of unstable temporary vortices at or near the free surface. In this manner, vortices are transitorily created across essentially the entirety of the free surface and dead areas are essentially eliminated. This method utilizes a traverse AC magnetic field with a fixed orientation between the AC magnetic field source and the liquid, avoiding the need for complex physical apparatus or intricate timing mechanisms, and allows precise, repeatable control of liquid flow velocities through selection of magnetic field frequencies. The method has use for various purposes, including but not limited to mixing heterogeneous components, facilitating chemical and biological reactions, reducing transfer resistances at or near the free surface of the liquid, or other process aided by liquid agitation

SUMMARY OF INVENTION

The present invention provides a method of driving liquid flow at or near a free surface using self-assembled structures composed of magnetic particles subjected to an external AC magnetic field. One embodiment of the invention generally comprises the following steps: (1) combining a liquid and a plurality of magnetic particles, wherein the magnetic particles have a density sufficient to remain at or near a free surface of the liquid by buoyancy or surface tension, such that the magnetic particles establish an area density with respect to the free surface of the liquid, and (2) applying an AC magnetic field oriented such that magnetic field lines traverse the free surface, such that some observed portion of the magnetic particles self-assemble into a multiplicity of individual chains, which organize into segments, which align to form snake structures exhibiting harmonic oscillation corresponding to the AC magnetic field frequency, such that the harmonic oscillation of the snake structures is sufficient to produce independent movement of the snake structures across the free surface. The method may be utilized to drive liquid flow in order to mix one or more materials, separate one or more materials, reduce transfer resistances, or other processes which may be aided by liquid agitation. The method may further comprise the steps of (3) discontinuing application of the AC magnetic field and (4) removing the magnetic particles from the liquid using magnetic attraction means.

The snake structures exhibit harmonic oscillation with the frequency of the magnetic field and drive unstable temporary liquid vortices, effectuating liquid flow over essentially the entirety of the free surface. The method may be utilized to drive liquid flow in order to mix one or more materials by adding materials to the liquid such that the temporary liquid vortices produce mixing. The method may also be utilized in order to separate one or more materials by providing magnetic particles treated to act as a capture moiety and adding a target agent to the liquid, such that the temporary liquid vortices create proximity between the capture moiety and the target agent and a binding reaction occurs. The method may also be used to reduce transfer resistances at or near the free surface of the liquid, or in other various processes which may be aided by liquid agitation. The method has advantage in that it does not rely on magnetic dipole moment alignment between magnetic particles and externally applied magnetic field lines to produce magnetic particle motion, and does not require either complex physical apparatus in order to physically relocate the magnetic field source or the medium, or, in the case of an electromagnet, intricate timing mechanisms to vary input power in a predetermined manner. This method can utilize a simple sinusoidal AC magnetic field from an AC magnetic field source which remains stationary relative to the medium containing the magnetic particles. Further, the method produces self-assembled structures independently moving across the liquid surface, driving liquid flow across essentially the entirety of the liquid surface to essentially eliminate dead flow areas.

DETAILED DESCRIPTION OF THE PREFERRED EMBODIMENTS

Figure 1:
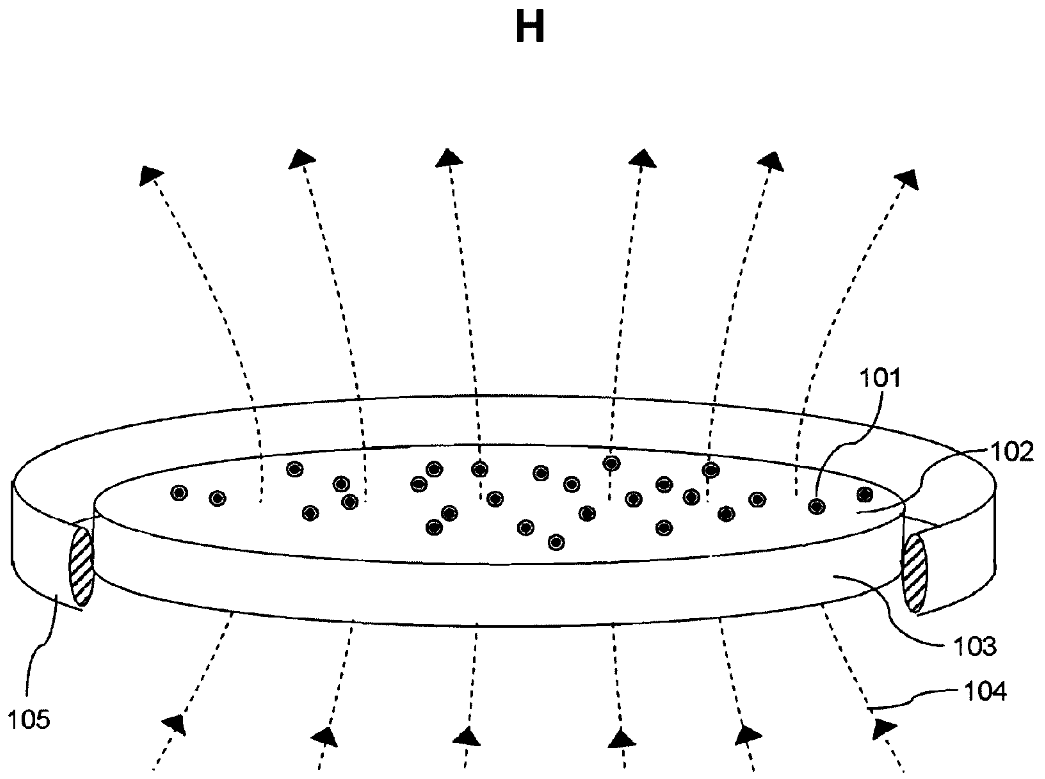
FIG. 1 shows a perspective view of a plurality of magnetic particles supported at or near a free surface of a liquid volume, subjected to AC magnetic field lines traversing the free surface.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for generating liquid flow at or near a free surface of a liquid using magnetic particles subject to an AC magnetic field. The liquid flow so generated may be useful for mixing heterogeneous components; facilitating chemical and biological reactions, reducing transfer resistances at or near the free surface of the liquid, and conducting other processes aided by liquid agitation.

The expression "free surface" referred to herein is meant to include a liquid surface where the pressure on the liquid surface is equal to an external pressure acting outside the bulk of the liquid. The free surface may occur at a liquid-gas or liquid-liquid interface.

The expression "magnetic field lines" referred to herein is meant to include a set of lines through space whose direction at any point is the direction of the local magnetic field vector, and whose density is proportional to the magnitude of the local magnetic field vector. Note that when a magnetic field is depicted with field lines, it is not meant to imply that the field is only nonzero along the drawn-in field lines. The field is typically smooth and continuous everywhere. The direction of the magnetic field corresponds to the direction that a magnetic dipole will orient itself in that magnetic field.

The expression "traversing the free surface" and the like referred to herein is meant to include AC magnetic field orientations where AC magnetic field lines change polarity over a given period and are non-parallel to a local plane on the free surface during that period.

The expression "magnetic dipole moment" referred to herein is meant to include measure of the strength of a magnetic particle's net magnetic source. Specifically, magnetic dipole moment quantifies the contribution of the system's internal magnetism to the dipolar magnetic field produced by the magnetic particle. The magnetic dipole moment reflects the magnetic particle's ability to turn itself into alignment with a given external magnetic field. In a uniform magnetic field, the magnitude of the magnetic dipole moment is proportional to the maximum amount of torque on the dipole.

The expression "at or near the free surface" referred to herein is meant to include a liquid layer where magnetic particles may be suspended on the free surface by surface tension, or maintained at a position in the liquid through buoyancy such that the magnetic particles produce oscillating surface waves on the free surface when subjected to an AC magnetic field traversing the free surface.

The expression "area density" referred to herein is meant to include the number of magnetic particles per unit area, and is correspondingly expressed as X $cm^{-2}$, where X is a non-negative integer expressing a quantity of magnetic particles.

The expression "critical magnetic field strength" referred to herein is meant to indicate the minimum value of AC magnetic field strength sufficient to produce the self-assembly of magnetic particles into chains, ferromagnetically aligned segments, and self-organized multi-segment structures. Critical magnetic field strength is a function of AC magnetic field frequency and magnetic particle area density, and alteration of either parameter will alter the value of the critical magnetic field strength necessary. For a given AC magnetic field frequency and magnetic particle area density, the critical magnetic field strength can be determined through visual observation of the magnetic particles utilized in this invention, and recognized as that minimum value of AC magnetic field strength where the magnetic particles self-assemble into chains, ferromagnetically aligned segments, and self-organized multi-segment structures harmonically oscillating at the AC magnetic field frequency.

The expression "capture moiety" referred to herein is meant to include a portion of a molecule, including molecules natural, synthetic, or recombinantly produced, that can be used to preferentially bind and separate a molecule of interest from a sample. The binding affinity of the capture moiety must be sufficient to allow collection of the molecule of interest from a sample.

The expression "target agent" referred to herein is meant to include the target moiety in a sample that is to be captured through preferential binding with the capture moiety. Target agents include organic and inorganic molecules, including biomolecules.

The following discussion will explain the principles of the method, followed by the discussion of the specific method steps in order to utilize the method.

Principles of the Method

Figure 2:
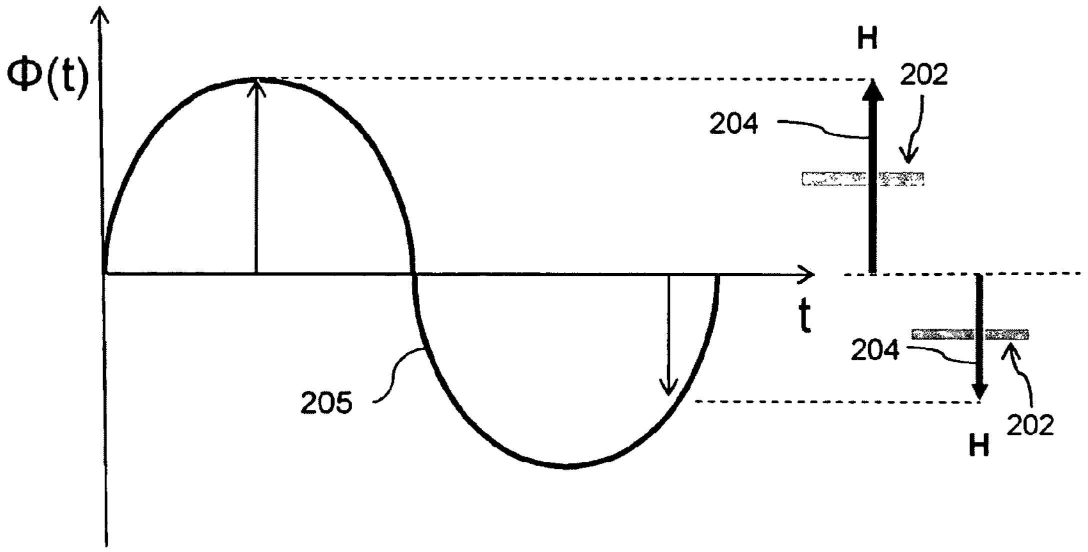
FIG. 2 shows the transitory polarity and magnitude of magnetic field lines emanating from an AC magnetic field source.

A set-up for utilizing the method disclosed herein is shown in FIG. 1. A plurality of magnetic particles 101 are supported at or near a free surface 102 of liquid volume 103 by the surface tension of free surface 102 or buoyancy force from liquid volume 103. AC Magnetic field lines 104 comprise AC magnetic field H, which emanates from an AC magnetic field source 105 and traverses the free surface 102. AC Magnetic field lines 104 are depicted in FIG. 1 exhibiting an illustrative polarity, however it is understood that AC magnetic field lines 104 transitorily shift polarity and magnitude according to the output frequency of the AC magnetic field source 105. For example, FIG. 2 illustrates the transitory polarity and magnitude of magnetic field lines 204 traversing free surface 202 that results from a sinusoidal output 205 of the AC magnetic field source. Individual magnetic particles within the plurality of magnetic particles 101 possess magnetic moments with respect to magnetic field lines 104, and possess dipolar magnetic fields in the space surrounding the individual particle.

Figure 3A:
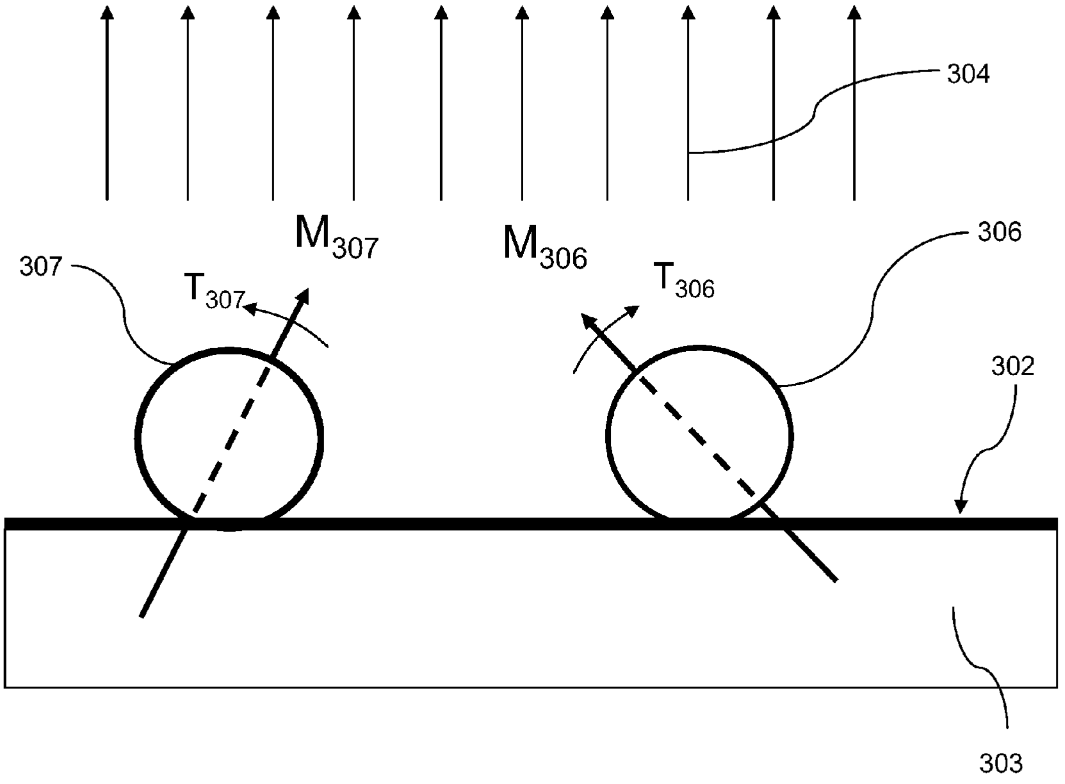
FIG. 3A shows individual magnetic particles supported at or near a free surface of a liquid volume, subjected to AC magnetic field lines traversing the free surface, possessing magnetic dipole moments and experiencing torques tending to align the magnetic dipole moment with the AC magnetic field lines.

FIG. 3A demonstrates the behavior of individual magnetic particle 306 having magnetic dipole moment $M_{306}$ supported at or near free surface 302 of liquid volume 303 subjected to magnetic field lines 304 at an illustrative polarity. $M_{306}$ quantifies the contribution of the internal magnetism of magnetic particle 306 to the external dipolar magnetic field produced by magnetic particle 306. As magnetic particle 306 is subjected to magnetic field lines 304, the magnetic particle 306 experience a torque $T_{306}$ tending to rotate the magnetic particle magnetic dipole moment $M_{306}$ such that the magnetic dipole moment $M_{306}$ aligns with magnetic field lines 304. The rotation of the magnetic dipole moment $M_{306}$ can occur in one of two ways: (i) the magnetic dipole moment itself can rotate inside a magnetic particle 306 against the magnetic anisotropy field, or (ii) the magnetic particle 306 can itself physically rotate. This torque acts on the magnetic dipole moment of magnetic particle 306 with a direction and magnitude according to the transitory magnitude and polarity of magnetic field lines 304 at any given time. In the course of a physical rotation, magnetic particle 306 drags surrounding fluid in liquid volume 303 and produces local oscillations of free surface 302. Similarly, neighboring magnetic particle 307 with magnetic dipole moment $M_{307}$ experiences a torque $T_{307}$ tending to align $M_{307}$ with magnetic field lines 304 and producing local oscillations of free surface 302.

Figure 3B:
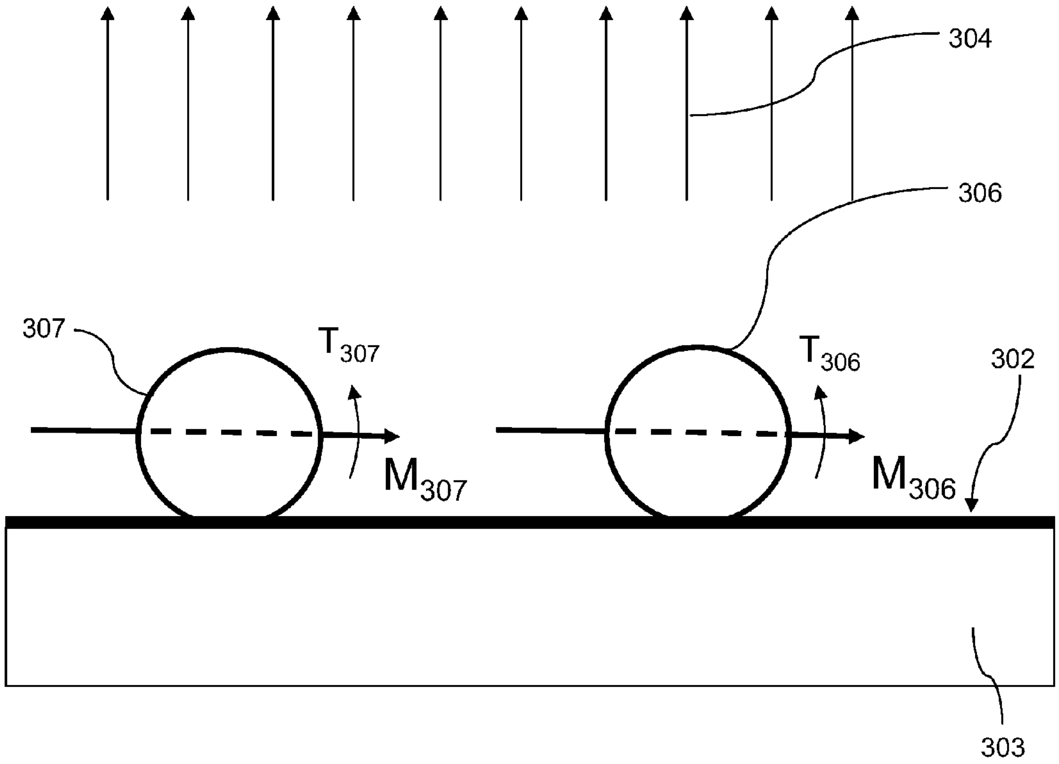
FIG. 3B shows individual magnetic particles supported at or near a free surface of a liquid volume, subjected to AC magnetic field lines traversing the free surface, possessing magnetic dipole moments and experiencing torques tending to align the magnetic dipole moment with the AC magnetic field lines, with sufficient magnetic particle area density such that dipole-dipole magnetic attraction between magnetic particles overcomes the experienced torques.

Magnetic particles 306 and 307 also individually possess dipolar magnetic fields, which cause magnetic particles 306 and 307 to experience dipole-dipole magnetic interaction with each other. The strength of these external dipolar magnetic fields decreases with distance from the individual magnetic particle as the inverse cube. As a result, magnetic particles 306 and 307 must be sufficiently close in order for this dipole-dipole magnetic interaction to be non-negligible relative to torques $T_{306}$ and $T_{307}$, which tend to align magnetic particles 306 and 307 with magnetic field lines 304. However, if magnetic particles 306 and 307 happen to be close enough to each other, the dipole-dipole magnetic interaction overcomes $T_{306}$ and $T_{307}$, such that dipole-dipole attraction causes magnetic particles 306 and 307 to align head-to-tail and a chain structure is formed essentially in the plane of free surface 302. Referring to FIG. 3B, magnetic particles 306 and 307 are shown in a condition where the dipole-dipole attraction is sufficient to resist torques $T_{306}$ and $T_{307}$ respectively, such that the magnetic particles 306 and 307 maintain this relative configuration rather than aligning with magnetic field lines 304. Again, it is understood that magnetic field lines 304 transitorily shift polarity and magnitude according to the output frequency of the AC magnetic field source.

Figure 4:
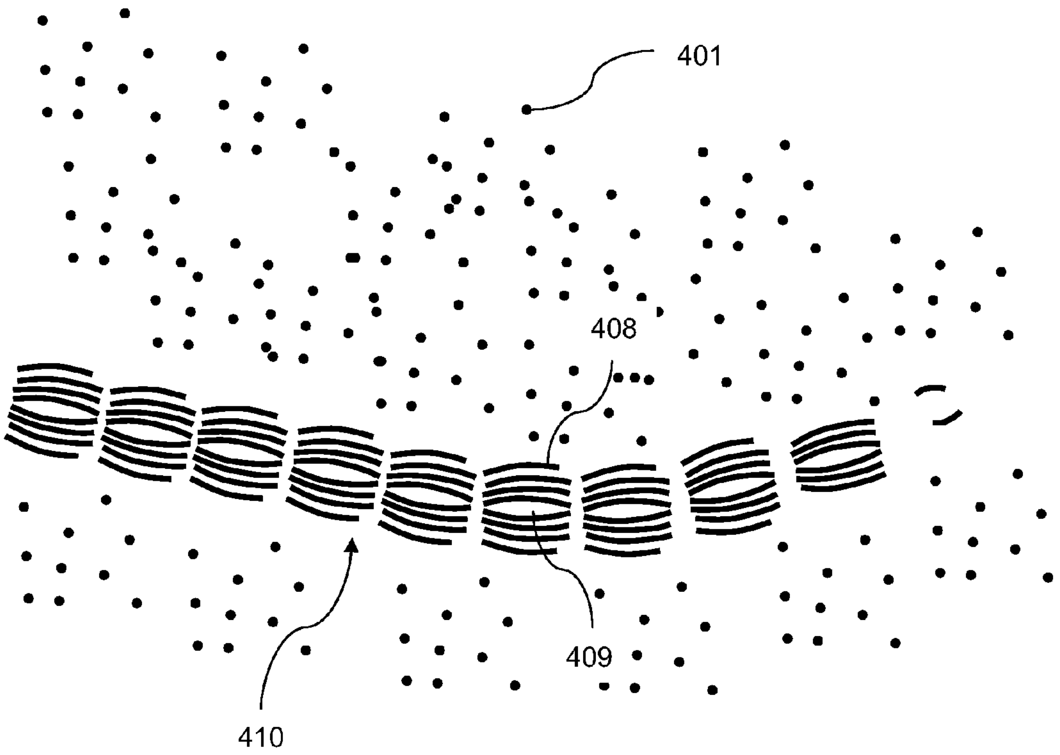
FIG. 4 shows magnetic particles supported at or near a free surface of a liquid volume, subjected to AC magnetic field lines traversing the free surface, self-assembled into chains, segments, and snake structures.

Now referring back to FIG. 1, in the course of magnetic moment alignment of the magnetic particles 101 with the magnetic field lines 104, individual magnetic particles drag surrounding liquid and produce local oscillations of the free surface 102. These local oscillations act to herd magnetic particles 101 into concentrated areas where, as the individual magnetic particles experience close proximity with each other, dipole-dipole attraction between magnetic particles acts to overcome the torque tending to align the particles with magnetic field lines 104. Consequently, a chain of ferromagnetically aligned magnetic particles is formed with a characteristic magnetic moment pointing along the chain. The chain further produces local wave-like oscillations, hereinafter referred to as surface waves, which facilitate the self-assembly process and further promote chaining. These chains organize into ferromagnetic segments which experience antiferromagentic alignment with other segments, and produce remarkable self-organized multi-segment structures, referred to hereinafter as snake structures. FIG. 4 demonstrates magnetic particles 401, some of which have formed chains 408, with chains 408 forming segments 409, and segments 409 forming snake structure 410.

As can be understood from the foregoing discussion, the magnetic particles act as a conduit to impart magnetic field energy from the AC magnetic field onto the free surface. Sufficient magnetic field energy must be imparted to the free surface to produce local surface oscillations, which then act to herd the magnetic particles into close proximity and facilitate chain formation. This is a necessary collective response of the free surface and the magnetic particles in order for chain formation to occur. As a result, the conditions necessary for chain formation exhibit a strong correlation between magnetic particle area density and magnetic field strength. For example, if magnetic particle area density is decreased, more magnetic field energy per particle must be transferred to produce the surface waves necessary for chain formation, and a higher magnetic field strength is required. Correspondingly, for an established area density of magnetic particles, there is a critical magnetic field strength below which chains will not form This relationship is demonstrated in FIG. 5 for magnetic field frequencies of 50 hz and 80 hz, using 90 μm magnetic nickel spheres suspended on water. For a given frequency, the critical magnetic field strength $H_o$ (Oe) below which chain formation does not occur relates to magnetic particle density ρ ($cm^{-2}$) such that $H_o^2$ is inversely proportional to ρ.

Figure 5:
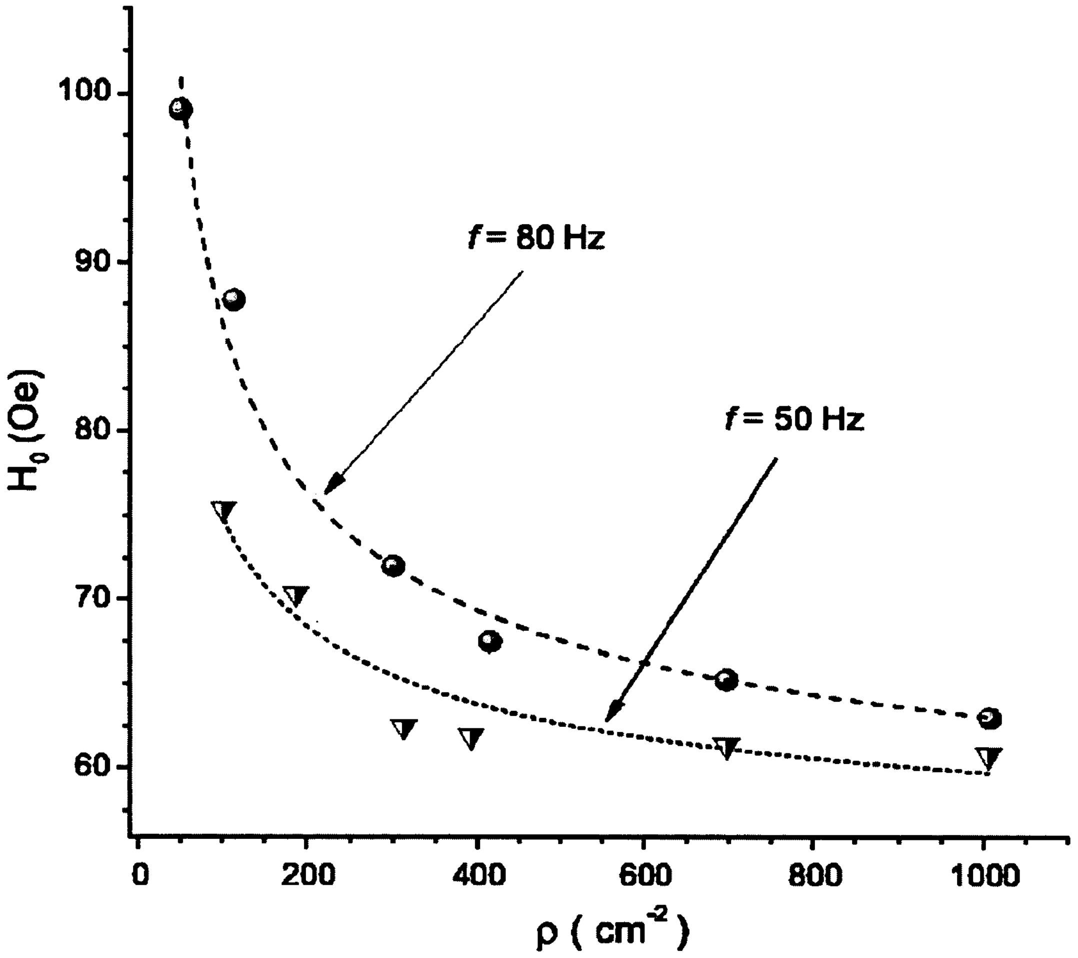
FIG. 5 shows critical field amplitude as a function of magnetic particle area density at AC magnetic field frequencies of 50 hz and 80 hz, using 90 μm magnetic nickel spheres suspended on water.

Note, from FIG. 5 that, for a given area density, the critical magnetic field strength $H_o$ increases as frequency increases. This is because the surface waves are directly driven by the oscillations of the magnetic particles at the frequency of the applied field. The energy required to produce the surface waves varies as the square of the frequency, so more energy must be delivered through the magnetic particles to excite the surface waves at higher frequencies. Note also that for a given frequency, the critical magnetic field strength $H_o$ is dependent on area density. Area density is defined as the number of magnetic particles per unit area, and is not affected by individual particle mass or size. Therefore, over the range of magnetic particles to which this novel method applies, critical magnetic field strength is largely independent of the nonmagnetic physical properties of the individual particles, such as particle diameter or particle mass density.

Figure 6A:
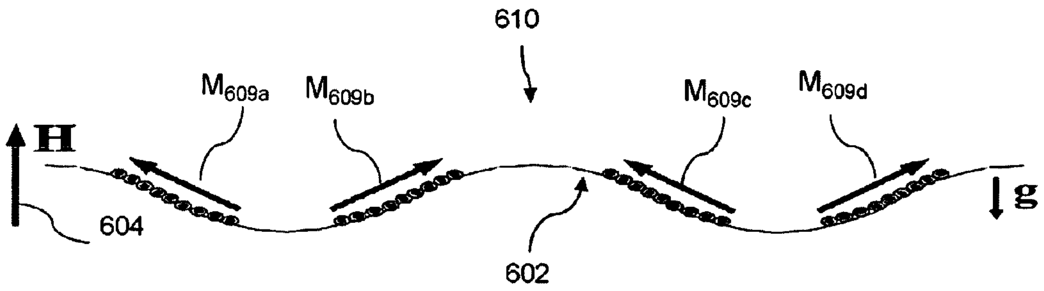
FIG. 6A shows a snake structure at or near a free surface of a liquid volume, composed of ferromagnetic segments antiferromagnetically aligned, producing surface waves which oscillate at the frequency of the AC magnetic field traversing the free surface at a first polarity.
Figure 6B:
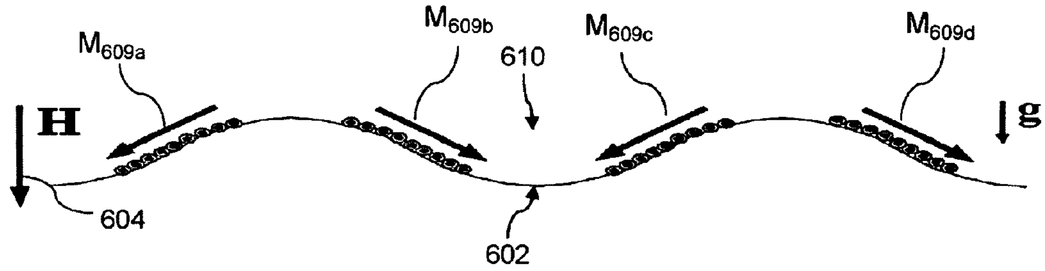
FIG. 6B shows a snake structure at or near a free surface of a liquid volume, composed of ferromagnetic segments antiferromagnetically aligned, producing surface waves which oscillate at the frequency of the AC magnetic field traversing the free surface at a second polarity.

The snake structures, once formed, continue to drive a resonant collective response of the free surface to the periodic driving force generated by the alternating magnetic field lines. The antiferromagnetic alignment between segments provides a very effective coupling between the oscillations of the component chains and the resulting oscillations of the free surface. FIG. 6A shows snake structure 610 composed of ferromagnetic segments having magnetic moments $M_{609a}$, $M_{609b}$, $M_{609c}$, and $M_{609d}$ respectively, subject to traverse AC magnetic field lines 604 at a first polarity. As shown in FIG. 6A, the ferromagnetic segments are antiferromagnetically aligned. As the ferromagnetic segments attempt to align their respective magnetic moments with the AC magnetic field lines 604, surface waves are generated at the free surface 602. For illustration, FIG. 6B shows snake structure 610 with magnetic moments $M_{609a}$, $M_{609b}$, $M_{609c}$, and $M_{609d}$ subject to traverse AC magnetic field lines 604 at a second polarity. As a result of magnetic moments $M_{609a}$, $M_{609b}$, $M_{609c}$, and $M_{609d}$ attempting to align with the alternating polarity of AC magnetic field lines 604 in FIGS. 6A and 6B, the free surface 602 experiences surface waves oscillating at the frequency of the AC magnetic field lines 604.

FIGS. 6A and 6B also illustrate an inherent frequency limitation in the system. The mechanical response time of the system is largely governed by the moment of inertia of individual magnetic particles in the system, given roughly by $\sqrt{I_o}/(MH_o)$, where $I_o$ is the moment of inertia, $H_o$ is the magnetic field amplitude, and M is the magnetic moment of a magnetic particle. At high frequencies, this mechanical response time can exceed the short period that exists for the magnetic particles to react before the magnetic field reverses polarity. This greatly inhibits snake structure formation and the corresponding development of asymmetric vortex flow. As a result, there is a maximum frequency beyond which the magnetic particles cannot effectively respond, and the snake structures utilized in this method will not self-assemble. For example, with 45 μm magnetic nickel spheres suspended on water, this frequency is approximately 300 hz. For a given liquid medium and magnetic particle material, the maximum frequency should be expected to vary inversely with particle diameter.

The novel method presented here describes snake structures that utilize surface wave oscillation to operate in an unstable regime, producing a surprising phenomena useful for mixing heterogeneous components, facilitating chemical and biological reactions, reducing transfer resistances at or near the free surface of the liquid, and conducting other processes aided by liquid agitation. In this unstable regime, the snake structures continuously self-assemble, oscillate, and are propelled by the oscillation in a direction essentially parallel to the surface of the liquid. During the course of this movement, an individual snake structure is largely unstable and may merge with other snake structures or break up into component segments, chains, or magnetic particles, which may then coalesce into additional snake structures experiencing independent movement across the liquid surface. Additionally, the snake structure oscillations drive asymmetric liquid vortices as they move through local regions of the liquid surface, and continue to form asymmetric vortices in this manner as the snake structure passes across the liquid surface. A multiplicity of snake structures independently moving across a liquid surface correspondingly generate a multiplicity of asymmetric vortices at or near the liquid surface, such that over a period of time the entirety of the liquid surface experiences some period of agitation by vortex flow.

Figure 7:
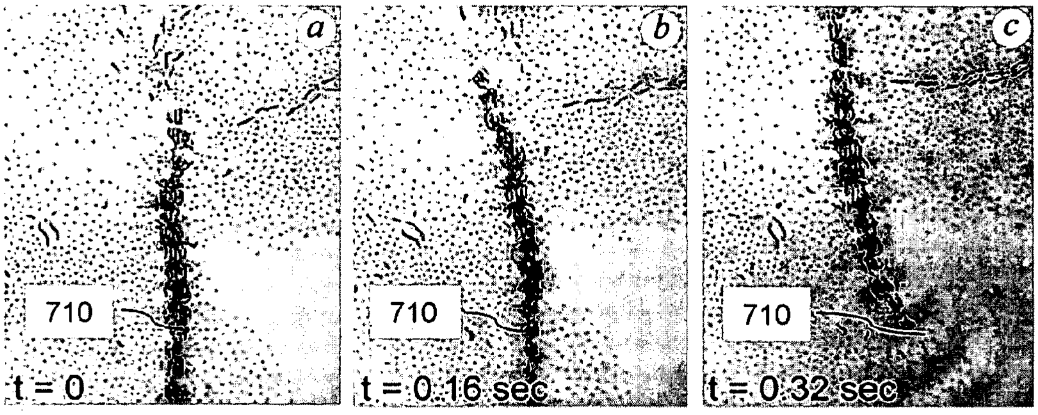
FIG. 7 shows a snake structure at or near a free surface of a liquid volume; subject to a traverse AC magnetic field, oscillating such that the snake structure is propelled across the surface of the liquid, using 45 μm magnetic nickel spheres suspended on water.
Figure 8:
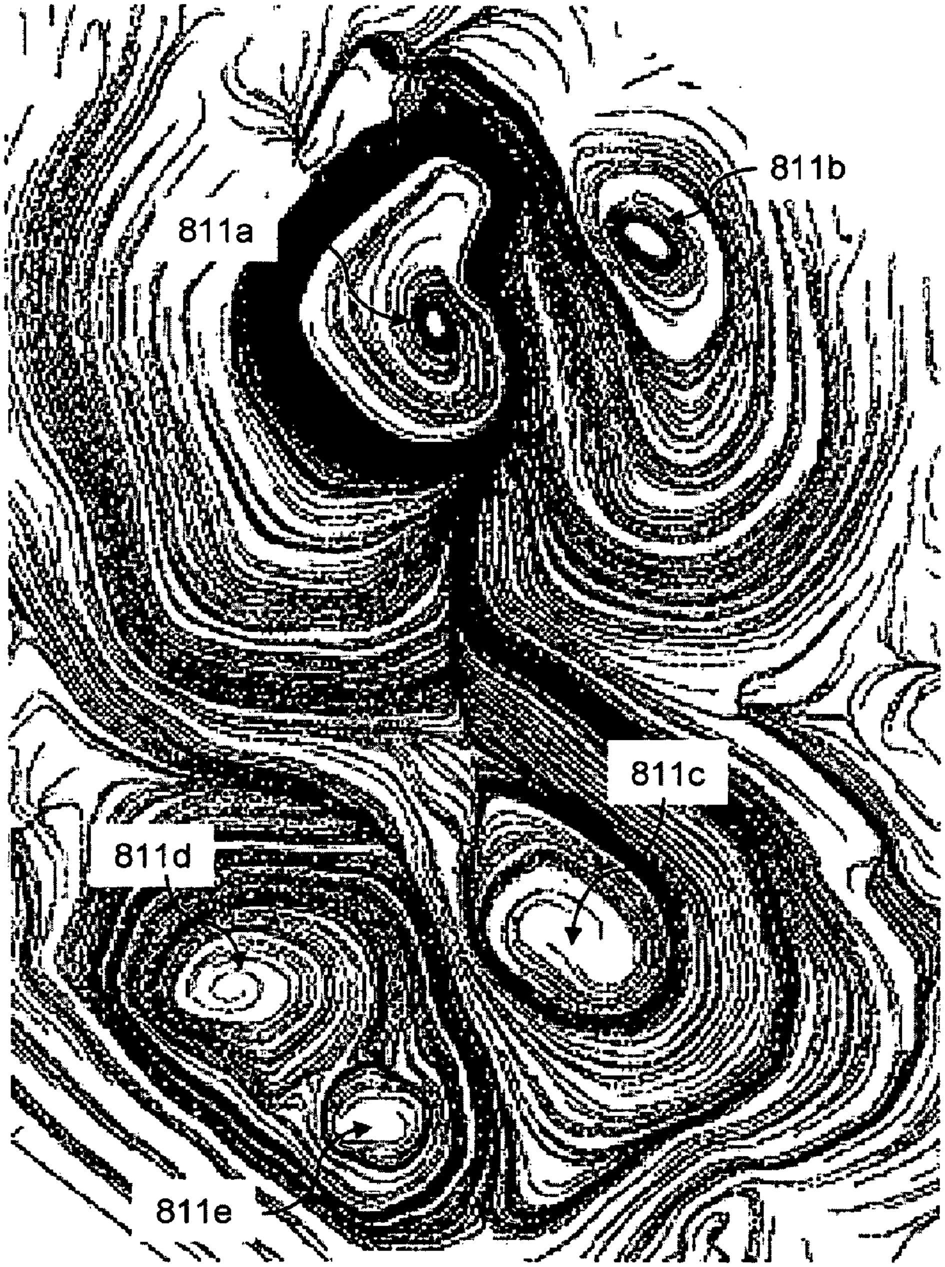
FIG. 8 shows asymmetric, temporary vortices produced by a snake structure independently moving across a liquid surface.

FIG. 7 shows a self-assembled snake structure 710 subject to a traverse alternating magnetic field and oscillating such that the snake structure is propelled across the surface of a liquid. FIG. 7 is a series of images captured from the same observation point at 0.00 seconds, 0.16 seconds, and 0.32 seconds. FIG. 8 demonstrates asymmetric vortices 811*a*, 811*b*, 811*c*, 811*d*, and 811*e*, produced by a snake structure independently moving across a liquid surface.

The novel method presented herein discusses the creation and use of self-assembled snake structures independently moving across a free surface to produce a series of temporary vortices to effectuate liquid flow over essentially the entirety of the free surface. The method generally comprises (1) combining a liquid and a plurality of magnetic particles, wherein the magnetic particles have a density sufficient to remain at or near a free surface of the liquid by buoyancy or surface tension, such that the magnetic particles establish an area density with respect to the free surface of the liquid, and (2) applying an AC magnetic field oriented such that magnetic field lines traverse the free surface, such that some observed portion of the magnetic particles self-assemble into a multiplicity of individual chains, which organize into segments, which align to form snake structures exhibiting harmonic oscillation corresponding to the AC magnetic field frequency, such that the harmonic oscillation of the snake structures is sufficient to produce independent movement of the snake structures across the free surface. The method may be utilized to drive liquid flow in order to mix one or more materials, separate one or more materials, reduce transfer resistances, or other processes which may be aided by liquid agitation. The method may further comprise the steps of (3) discontinuing application of the AC magnetic field and (4) removing the magnetic particles from the liquid using magnetic attraction means.

Combining a Liquid and a Plurality of Magnetic Particles

Referring to FIG. 1, a plurality of magnetic particles 101 are combined with liquid volume 103 having free surface 102 such that magnetic particles 101 are supported at or near the free surface 102. Preferably, magnetic particles 101 are suspended at the free surface 102 by the surface tension of free surface 102, but magnetic particles 101 may also be maintained at or near free surface 102 through buoyancy forces from liquid volume 103. Either physical phenomena may be utilized provided that magnetic particles 101 interact with free surface 102 to produce oscillating surface waves when subjected to a traverse AC magnetic field.

Magnetic particles 101 may be any particles that are influenced by a magnetic field. They may consist of purely ferromagnetic material or a ferro-material coated or mixed with another material such as a polymer, a protein, a detergent, a lipid or a non-corroding material. The magnetic particles are preferably not permanently magnetic, but permanently magnetic particles can be used. Preferably the magnetic material within a magnetic particle is essentially inert to the surrounding liquid and any reactions occurring therein. Magnetic particles 101 may have a diameter as small as 1 μm. Below 1 μm, magnetic particles 101 will tend to agglomerate and greatly inhibit self-assembly into structures that ultimately drive liquid flow. For embodiments of the novel method demonstrated herein, magnetic particles 101 should have a diameter from 30 μm to 150 μm.

Magnetic particles 101 supported at or near the free surface 102 are collectively characterized by area density, where area density is the number of particles per unit area. FIG. 1 illustrates an area density of magnetic particles 101 defined by the quantity of magnetic particles 101 divided by the area of free surface 102. As discussed, the area density of magnetic particles 101 will directly impact the critical magnetic field strength of the traverse AC magnetic field required to form self-assembled structures driving liquid flow. For embodiments of the novel method demonstrated herein, magnetic particles 101 should have an area density from 100 $cm^{-2}$ to 1000 $cm^{-2}$.

Liquid volume 103 may be any liquid suitable for use with a desired application, provided the kinematic properties of the liquid allow magnetic particles 101 to drag surrounding liquid and produce local oscillations of the free surface 102 when subjected to a traverse AC magnetic field, such that magnetic particles 101 are concentrated and dipole-dipole attractions can occur. In some embodiments, the liquid should be compatible with a biomolecule. One example of a suitable liquid is water, which may or may not contain buffers, salts, surfactants, or other agents that may be required for maintaining the integrity of, for example, biological samples. In some embodiments, the liquid may include a sample. Generally, any sample in need of mixing or movement may be suitable. Samples may have any form, for example a fluid, a liquid, a dispersion, an emulsion, or have multiple phases. Examples of suitable samples include but are not limited to, a cell culture, a biological sample (e.g., a blood preparation), an environmental sample (e.g., water sample), a food sample (e.g., for pathogen detection), a microbial sample, a forensic sample, and the like. If required, support for the liquid volume can have any shape and should consist of non-magnetic material such as, e.g. glass, plastic, ceramic, or other non-magnetic material. For embodiments of the novel method demonstrated herein, liquid volume 103 should be water, or a liquid having flow properties similar to water.

Applying a Traverse AC Magnetic Field

The AC magnetic field source 105 should be oriented with respect to free surface 102 such that magnetic field lines 104 emanating from AC magnetic field source 105 traverse the free surface 102. The AC magnetic field source 105 may be any source which is excitable from an alternating current source to derive alternating magnetic flux fields. This may include single or paired electromagnets in the form of wire coils, such as Helmholtz coils, solenoids, or similar air core technologies. The AC magnetic field source 105 should be capable of magnetic field strengths of at least 100 Oe and magnetic field frequencies of at least 100 hz. Preferably, the AC magnetic field source is capable of magnetic field strengths up to 150 Oe and magnetic field frequencies up to 200 hz. For the specific embodiments presented here, the AC magnetic field source 105 was an electromagnetic coil driven by a Agilent 33220A Arbitrary waveform generator KEPCO BOP200-1D bipolar power amplifier (Santa Clara, Calif.).

Initially, AC magnetic field source 105 emanates magnetic field lines 104 at an AC magnetic field strength $H_{init}$ and an AC magnetic field frequency $f_{init}$. Initial AC magnetic field strength $H_{init}$ may be any value provided magnetic field lines 104 traverse free surface 102, so that individual magnetic particles within magnetic particles 101 experience a torque tending to align the individual magnetic particle's magnetic dipole moment parallel to the direction of AC magnetic field lines 104. Initial AC magnetic field frequency $f_{init}$ may be any value below that which requires a mechanical response time shorter than that which the system can provide, as discussed earlier. A typical maximum frequency is 300 hz, using 45 μm magnetic nickel spheres suspended on water. Preferably, the initial AC magnetic field frequency $f_{init}$ is 200 hz or less. As discussed previously, for a given liquid medium and magnetic particle material, the maximum frequency should be expected to vary inversely with particle diameter.

At this point, the values of AC magnetic field strength $H_{init}$ and an AC magnetic field frequency $f_{init}$ may be sufficient to successfully realize the method presented here. If so, visual observation will confirm self-assembled snake structures experiencing independent movement across free surface 102. The self-assembled snake structures will be largely unstable, merging with other snake structures or breaking up into component segments, chains, or magnetic particles, which may then coalesce into additional snake structures experiencing independent movement across the liquid surface 102. However, if this behavior is not observed, determination of AC magnetic field parameters sufficient to provoke this behavior is discussed further below.

Provoking Self-Assembled Snake Structures

As discussed previously, for an established area density of magnetic particles subject to an AC magnetic field at a given AC magnetic field frequency, there is a critical magnetic field strength below which snake structures, such as snake structure 410 shown in FIG. 4, will not form. FIG. 5 shows exemplary critical magnetic field strengths $H_o$ resulting from magnetic particle area densities of from 100 $cm^{-2}$ to 1000 $cm^{-2}$, at AC magnetic field frequencies of 50 hz and 80 hz.

If the initial AC magnetic field strength $H_{init}$ established above is less than the critical magnetic field strength corresponding to the AC magnetic field frequency $f_{init}$, the resulting local oscillations of free surface 102 will be insufficient to herd magnetic particles 101 into close proximity, where dipole-dipole interactions overcome the torque seeking to align individual magnetic dipole moments with magnetic field lines 104. In this situation, the behavior of magnetic particles 101 will continue to be governed by the aligning torque, and magnetic particles 101 will fail to self-assemble into snake structures. This can be recognized visually, if magnetic particles 101 remain dispersed over free surface 102 and fail to self-assemble into snake structures once the traverse AC magnetic field is applied. In this case, AC magnetic field source 105 should be adjusted such that the AC magnetic field strength of magnetic field lines 104 at least equals the critical magnetic field strength necessary for chain formation at the AC magnetic field frequency $f_{init}$. As the AC magnetic field strength is increased, the critical magnetic field strength will be recognized when magnetic particles 101 transition from dispersed particles into self-assembled snake structures. The AC magnetic field strength can then be further increased without any detrimental impact on snake structure formation.

Conversely, if the initial AC magnetic field strength $H_{init}$ of magnetic field lines 104 equals or exceeds the critical magnetic field strength for the established magnetic particle area density and initial AC magnetic field frequency $f_{init}$ then magnetic particles 101 will self-assemble into snake structures when the traverse AC magnetic field is applied to free surface 102. For specific embodiments of the novel method demonstrated herein, AC magnetic field strengths from 100 Oe to 150 Oe were utilized. Again, the AC magnetic field strength can then be further increased without any detrimental impact on snake structure formation.

At this point in the method, with AC magnetic field strength equal or exceeding the critical magnetic field strength for the established area density and the initial AC magnetic field frequency $f_{init}$, the snake structures will self-assemble and harmonically oscillate at the initial AC magnetic field frequency $f_{init}$. If the AC magnetic field strength is reduced below the critical magnetic field strength, the snake structures will break up into component magnetic particles and disperse on the liquid surface. The component magnetic particles will remain dispersed until the AC magnetic field strength is returned to a value equal to or exceeding the critical magnetic field strength, after which the dispersed particles will then reform into snake structures oscillating at the initial AC magnetic field frequency $f_{init}$.

Depending on the initial AC magnetic field frequency $f_{init}$ once the critical magnetic field strength is established or exceeded, the harmonic oscillations of the snake structures may be sufficient to produce snake structure movement across free surface 102. In this case, the snake structures can be visually observed to be largely unstable, merging with other snake structures or breaking up into component segments, chains, or magnetic particles, which may then coalesce into additional snake structures experiencing independent movement across the liquid surface. However, if this behavior is not observed, further determination of AC magnetic field parameters sufficient to provoke independent movement of the snake structures is discussed further below.

Provoking Independent Movement of the Snake Structures

If the snake structures are not observed to independently move across the free surface 102, such that they exhibit largely unstable behavior and merge with other snake structures or break up into component segments, chains, or magnetic particles which may then coalesce into additional snake structures, it is necessary to increase the initial AC magnetic field frequency $f_{init}$. During this process, it may also be necessary to again increase the AC magnetic field strength, depending on the degree to which the AC magnetic field strength exceeds the critical magnetic field strength required at the initial AC magnetic field frequency $f_{init}$.

If AC magnetic field frequency is increased beyond the initial AC magnetic field frequency $f_{init}$, one of two behaviors will result, depending on the AC magnetic field strength. As discussed previously and shown in FIG. 5, the critical magnetic field strength increases as AC magnetic frequency increases. As a result of this relationship, if AC magnetic field strength is held constant and the AC magnetic field frequency is increased, then the harmonic oscillations of the snake structures will increase as AC magnetic field frequency is increased until at some AC magnetic field frequency either (1) the oscillations are sufficient to propel the snake structures across the surface of the liquid, or (2) the necessary value of critical magnetic field strength exceeds the AC magnetic field applied, and the snake structures break up into component magnetic particles and disperse on the liquid surface. Both of these behaviors can be recognized through visual observation. If the latter behavior results, then AC magnetic field strength must be correspondingly increased to equal or exceed the critical magnetic field strength. This situation is illustrated in FIG. 9.

Figure 9:
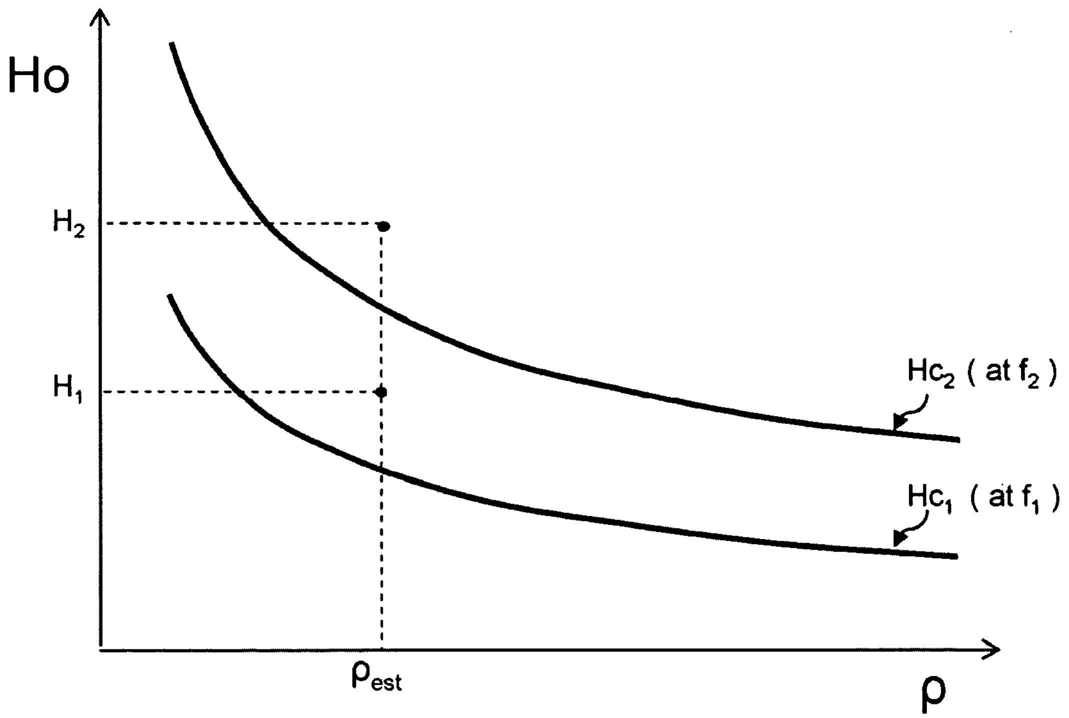
FIG. 9 shows critical field amplitude as a function of magnetic particle area density at representative AC magnetic field frequencies of $f_1$ and $f_2$, demonstrating operating points at AC magnetic field strengths $H_1$ and $H_2$.

FIG. 9 shows operating characteristics of a system similar to that depicted in FIG. 1, comprised of magnetic particles suspended at or near the free surface of a liquid and subject to a traverse AC magnetic field. FIG. 9 shows critical magnetic field strengths $Hc_1$ and $Hc_2$ plotted against magnetic particle area density ρ. $Ho_1$ and $Ho_2$ correspond to operating AC magnetic field frequencies $f_1$ and $f_2$, where $f_2$ is greater than $f_1$. The magnetic particles in this system have an established area density $\rho_{est}$. Initially, the system operates at AC magnetic field strength $H_1$ and AC magnetic field frequency $f_1$. As can be seen in FIG. 9, at the AC magnetic field frequency $f_1$, $H_1$ exceeds the critical magnetic field strength $Hc_1$. As a result, the magnetic particles will form chains and resultant snake structures. Now assume that AC magnetic field frequency is increased from $f_1$ to $f_2$, while the AC magnetic field strength is maintained at $H_1$. Because the AC magnetic frequency has increased to $f_2$, the critical magnetic field strength has correspondingly increased, to $Hc_2$. With the system is now operating at AC magnetic field strength H, and AC magnetic field frequency $f_2$, $H_1$ is now less than the critical magnetic field strength $Hc_2$. As a result, the snake structures will break up into component magnetic particles and disperse on the liquid surface. The component magnetic particles will remain dispersed until the AC magnetic field strength is increased to a value equal to or exceeding the critical magnetic field strength $Hc_2$, such as $H_2$. Once the system is operating at a AC magnetic field strength $H_2$ and an AC magnetic frequency $f_2$, the dispersed particles will then reform into snake structures oscillating at the AC magnetic field frequency $f_2$. If the snake structure oscillations at AC magnetic field frequency $f_2$ are insufficient to propel the snake structures across the surface of the liquid, then the AC magnetic field frequency and possibly AC magnetic field strength must be further increased as above until this behavior is achieved.

With reference to FIG. 9, it is also worth noting that, as mentioned earlier, with the system operating at an AC magnetic field strength $H_1$ and an AC magnetic field frequency $f_1$, such that snake structures form and oscillate at the AC magnetic field frequency $f_1$, the AC magnetic field strength could be increased from $H_1$ to $H_2$ without any detrimental impact on the snake structures. At the AC magnetic field strength $H_2$, then the AC magnetic frequency could be increased from $f_1$ to $f_2$ and the snake structures will be maintained during the frequency increase. In this situation, the oscillations of the snake structures can be specifically controlled over the frequency range $f_1$ to $f_2$, since the snake structures oscillate at the frequency of the AC magnetic field.

Therefore, from the foregoing discussion, it can be understood that, if it is necessary to increase AC magnetic field frequency beyond the initial AC magnetic field frequency $f_{init}$, so that snake structure oscillations increase and independent movement across the free surface results, it may also be necessary to raise the AC magnetic field strength to equal or exceed the critical magnetic field strength at the increased AC magnetic field frequency. The critical magnetic field strength can be recognized visually as the AC magnetic field strength where magnetic particles reform into snake structures oscillating at the AC magnetic field frequency. Again, the AC magnetic field strength can then be further increased beyond the critical magnetic field strength without detrimental impact on chain formation. Additionally, if the necessary AC magnetic field strength for snake structure oscillation at a specific AC magnetic field frequency is known from prior experience, the AC magnetic field strength can be established prior to, concurrent with, or following any increase in AC magnetic field frequency. For specific embodiments of the novel method demonstrated herein, AC magnetic field frequencies of from 150 hz to 200 hz were utilized with AC magnetic field strengths of from 100 Oe to 150 Oe.

FIG. 7 shows one embodiment with self-assembled snake structure 710 subject to a traverse alternating magnetic field at an AC magnetic field strength equal to or exceeding the critical magnetic field strength, and an AC magnetic field frequency such that the resulting snake structure oscillations propel the snake structure across the surface of a liquid. FIG. 7 is a series of images captured from the same observation point at 0.00 seconds, 0.16 seconds, and 0.32 seconds. FIG. 8 demonstrates asymmetric vortices 811*a*, 811*b*, 811*c*, 811*d*, and 811*e* produced by a snake structure independently moving across a liquid surface. The novel method herein is realized when the oscillations of a self-assembled snake structure such as snake structure 710 are sufficient to propel the snake structure across a free surface and produce asymmetric vortices such as 811*a*, 811*b*, 811*c*, 811*d*, and 811*e* at or near the free surface, as the snake structure continues across the free surface and may merge with other snake structures or break up into component segments, chains, or magnetic particles, which may then coalesce into additional snake structures experiencing independent movement across the liquid surface.

Figure 10:
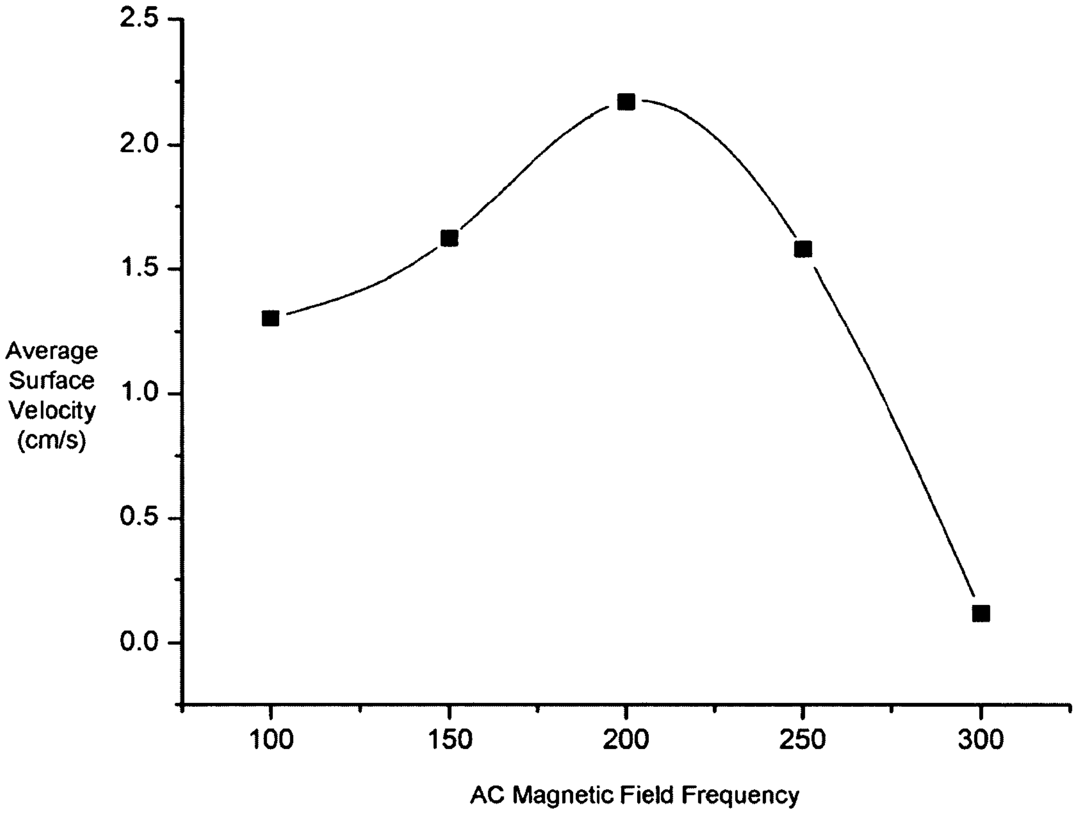
FIG. 10 shows average surface velocity as a function of AC magnetic field frequency at an AC magnetic field strength of 150 Oe, using 45 μm magnetic nickel spheres suspended on water.

Because the independently moving snake structures oscillate at the AC magnetic field frequency, and because these oscillations drive asymmetric vortices at or near the free surface, the independently moving snake structures and corresponding asymmetric vortices produce an average surface flow velocity which varies according to the AC magnetic field frequency. The average flow velocity produced over a frequency range is consistent and repeatable for specific magnetic particles at a specific area density, using a specific liquid and a specific magnetic field strength. This allows frequency selection based on an average surface flow velocity desired. FIG. 10 shows average surface velocity across the free surface as a function of magnetic field frequency with a magnetic field strength of 150 Oe, using 45 μm magnetic nickel spheres at an area density of 1000 $cm^{-2}$ suspended on water. Referring to FIG. 10, in this embodiment average surface velocity increases as magnetic field frequency increases from 100 hz to approximately 200 hz.

The decrease in average surface velocity beyond 200 hz seen in FIG. 10 occurs because of the mechanical response time of the system, as discussed previously. The negative impact of mechanical response time on average surface velocity becomes more pronounced as frequency is further increased. At a frequency of approximately 300 hz, the short response demanded by the high frequency exceeds the mechanical response time of this system to such a degree that vortex production and surface flow essentially cease.

Illustrative Uses of the Novel Method

The vortex flows produced using the methods described herein are useful for the creation of forced circulation at or near the free surface of a liquid for various purposes, including but not limited to mixing heterogeneous components, facilitating chemical and biological reactions, reducing transfer resistances at or near the free surface of the liquid, or other processes aided by liquid agitation. Various degrees of agitation are available through adjustment of the magnetic field parameters without a requirement to physically relocate the magnetic field source or the liquid, or, in the case of an electromagnet, through an intricate control system to vary input power. The method allows operations on large or small volume samples which are precise, repeatable, and controlled.

The mixing and separation processes of the present invention have particular utility in various laboratory and clinical procedures involving biospecific affinity binding reactions for separations. In such procedures, magnetic particles are used which are treated such that the magnetic particles possess a capture moiety, which is used to preferentially bind and separate a target agent from a sample. Magnetic particles may be synthesized to possess a capture moiety using methods known in the art, such as U.S. Pat. No. 5,091,206, U.S. Pat. No. 5,395,688, and U.S. Pat. No. 4,177,253, incorporated herein by reference. In accordance with the method herein, magnetic particles synthesized to possess a capture moiety are maintained at or near the surface of a liquid medium containing a target agent. The magnetic particles are subjected to a traverse magnetic field such that flow vortices are formed at or near the surface of the liquid, promoting a high rate of close contact between the target agent and the capture moiety for a sufficient time to ensure optimum binding. The magnetic particles may be maintained at or near the liquid surface by surface tension or buoyancy. The magnetic particles may then be separated from the liquid using a means for magnetic attraction, such as a permanent magnet, and the target agent may be recovered by means known in the art, such as treatment with a displacing agent, changing the pH of a medium contacting both the capture moiety and target agent, or other means.

The mixing process may be used during operations requiring the transfer of substances and/or heat between two fluid phases including a liquid, for example, a gas-liquid phase. In these operations, the resistance against the transfer of substances and/or heat is present mainly in the vicinity of the interface between two phases. In order to decrease such resistance and enhance the transfer rate between the two phases, it is necessary to cause a disturbance in the interface between the two phases. In accordance with the method herein, magnetic particles may be maintained at or near the interface and subjected to a traverse magnetic field such that flow vortices are formed at or near the surface of the liquid. As a result, disturbance is caused in the interface between the two phases and in the vicinity thereof, and the speed of transfer of substances and/or heat is improved. The magnetic particles may be maintained at or near the liquid surface by surface tension or buoyancy. In conjunction, a mixing means within the liquid such as a stirring vane may be employed to accelerate diffusion of the adsorbed component or heat throughout the liquid contained below the surface.

The mixing produced by the described method permits an effective stirring of a liquid to be realized in a relatively shallow vessel, where a stirrer with blades or other mechanical means cannot be used practically in a non-contact manner. The vessel must permit a sufficient depth of liquid such that surface waves are induced by the magnetic particles subjected to a traverse magnetic field. This depth would be expected to depend largely on the density, kinematic viscosity, and surface tension of the liquid, as well as the applied magnetic field frequency.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as it each individual publication or patent document were so individually denoted.

What is claimed is:

1. A method for driving liquid flow, comprising:

combining a liquid and a plurality of magnetic particles, wherein the magnetic particles have a density sufficient to remain at or near a free surface of the liquid by buoyancy or surface tension, such that the magnetic particles establish an area density with respect to the free surface of the liquid; and applying an AC magnetic field oriented such that magnetic field lines traverse the free surface, the AC magnetic field having an AC magnetic field frequency and an AC magnetic field strength such that some observed portion of the magnetic particles self-assemble into a multiplicity of individual chains, which organize into segments, which align to form snake structures exhibiting harmonic oscillation corresponding to the AC magnetic field frequency, wherein the harmonic oscillation of the snake structures is sufficient to produce independent movement of the snake structures across the free surface, forming a series of temporary liquid vortices and driving liquid flow at or near the free surface.

2. The method of claim 1, for driving liquid flow in order to mix one or more materials, further comprising:

adding one or more materials to the liquid such that the liquid flow produces mixing of the one or more materials at or near the surface of the liquid.

3. The method of claim 2, further comprising:

discontinuing application of the AC magnetic field, and removing the magnetic particles from the liquid using a means for magnetic attraction.

4. The method of claim 1, for driving liquid flow in order to separate one or more materials, further comprising:

providing magnetic particles treated to act as a capture moiety, and adding one or more materials to the liquid to act as a target agent, such that the liquid flow at or near the free surface creates proximity between the capture moiety and the target agent, such that a binding reaction occurs between a portion of the capture moiety and a portion of the target agent.

5. The method of claim 1, wherein the AC magnetic field strength is applied at a critical magnetic field strength sufficient to produce the self-assembly of the magnetic particles at the area density into a multiplicity of individual chains, which organize into segments, which align to form snake structures exhibiting harmonic oscillation corresponding to the AC magnetic field frequency.

6. The method of claim 1, wherein the magnetic particles are at least 1 μm in diameter.

7. The method of claim 1, wherein the magnetic particles are from 1 μm to 150 μm in diameter, the AC magnetic field frequency is from 100 hz to 300 hz, the AC magnetic field strength is from 100 Oe to 150 Oe, and the area density of magnetic particles is from 100 $cm^{-2}$ to 1000 $cm^{-2}$.

8. The method of claim 1, wherein a frequency of the AC magnetic field is selected such that the snake structures drive liquid flow at or near the liquid surface at a specific average surface velocity.

9. A method for driving liquid flow, comprising:

combining a liquid and a plurality of magnetic particles, wherein the magnetic particles have a density sufficient to remain at or near a free surface of the liquid by buoyancy or surface tension, such that the magnetic particles establish an area density with respect to the free surface of the liquid;

applying an AC magnetic field oriented such that magnetic field lines traverse the free surface, the AC magnetic field having an AC magnetic field frequency and an AC magnetic field strength sufficient to cause some observed portion of the magnetic particles to self-assemble into a multiplicity of individual chains, which organize into segments, which align to form snake structures exhibiting harmonic oscillation corresponding to the AC magnetic field frequency; and adjusting the AC magnetic field frequency, while maintaining the AC magnetic field strength such that snake structures exhibiting harmonic oscillation corresponding to the AC magnetic field frequency are observed, such that the harmonic oscillation of the snake structures is sufficient to produce independent movement of the snake structures across the free surface, wherein the independent movement of the snake structures across the free surface forms a series of temporary liquid vortices and drives liquid flow at or near the free surface.

10. The method of claim 9, for driving liquid flow in order to mix one or more materials, further comprising:

adding one or more materials to the liquid such that the liquid flow produces mixing of the one or more materials at or near the surface of the liquid.

11. The method of claim 10, further comprising:

discontinuing application of the AC magnetic field, and removing the magnetic particles from the liquid using a means for magnetic attraction.

12. The method of claim 9, for driving liquid flow in order to separate one or more materials, further comprising:

providing magnetic particles treated to act as a capture moiety, and adding one or more materials to the liquid to act as a target agent, such that the liquid flow at or near the free surface creates proximity between the capture moiety and the target agent, such that a binding reaction occurs between a portion of the capture moiety and a portion of the target agent.

13. The method of claim 9, wherein the AC magnetic field strength is applied at a critical magnetic field strength sufficient to produce the self-assembly of the magnetic particles at the area density into a multiplicity of individual chains, which organize into segments, which align to form snake structures exhibiting harmonic oscillation corresponding to the AC magnetic field frequency.

14. The method of claim 9, wherein the magnetic particles are at least 1 μm in diameter.

15. The method of claim 9, wherein the magnetic particles are from 1 μm to 100 μm in diameter, the AC magnetic field frequency is from 100 hz to 300 hz, the AC magnetic field strength is from 100 Oe to 150 Oe, and the area density of magnetic particles is from 100 $cm^{-2}$ to 1000 $cm^{-2}$.

16. The method of claim 9, wherein a frequency of the AC magnetic field is selected such that the snake structures drive liquid flow at or near the liquid surface at a specific average surface velocity.

17. A method for driving liquid flow, comprising:

combining a liquid and a plurality of magnetic particles, wherein the magnetic particles have a density sufficient to remain at or near a free surface of the liquid by buoyancy or surface tension and a diameter from 1 μm to 150 μm, such that the magnetic particles establish an area density from 100 $cm^{-2}$ to 1000 $cm^{-2}$ with respect to the free surface of the liquid; and applying an AC magnetic field oriented such that magnetic field lines traverse the free surface, the AC magnetic field having an AC magnetic field frequency from 100 hz to 300 hz and an AC magnetic field strength from 100 Oe to 150 Oe such that some observed portion of the magnetic particles self-assemble into a multiplicity of individual chains, which organize into segments, which align to form snake structures exhibiting harmonic oscillation corresponding to the AC magnetic field frequency, such that the harmonic oscillation of the snake structures is sufficient to produce independent movement of the snake structures across the free surface, wherein the independent movement of the snake structures across the free surface forms a series of temporary liquid vortices and drives liquid flow at or near the free surface.

18. The method of claim 17, for driving liquid flow in order to mix one or more materials, further comprising:

adding one or more materials to the liquid such that the liquid flow produces mixing of the one or more materials at or near the surface of the liquid.

19. The method of claim 18, further comprising:

discontinuing application of the AC magnetic field, and removing the magnetic particles from the liquid using a means for magnetic attraction.

20. The method of claim 17, for driving liquid flow in order to separate one or more materials, further comprising:

providing magnetic particles treated to act as a capture moiety, and adding one or more materials to the liquid to act as a target agent, such that the liquid flow at or near the free surface creates proximity between the capture moiety and the target agent, such that a binding reaction occurs between a portion of the capture moiety and a portion of the target agent, discontinuing application of the AC magnetic field, removing the capture moiety from the liquid using a means for magnetic attraction of the magnetic particles treated to act as the capture moiety, thereby also removing the portion of the target agent bound to the portion of the capture moiety, and recovering the portion of the target agent by separation from the portion of the capture moiety.

* * * * *